March 26, 1957     C. TYSKA     2,786,910
ELECTRICAL CURB PARKING SIGNAL FOR AUTOMOBILES
Filed July 14, 1954
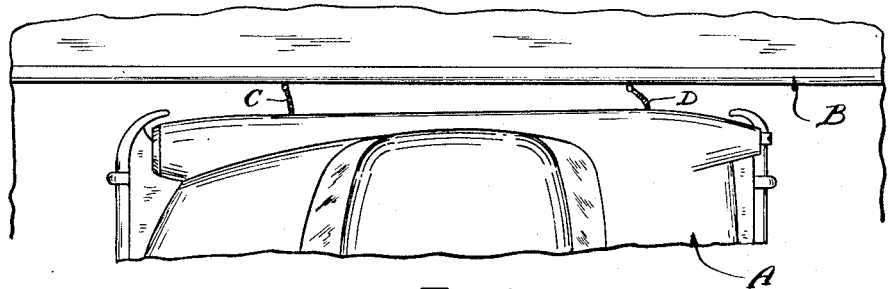
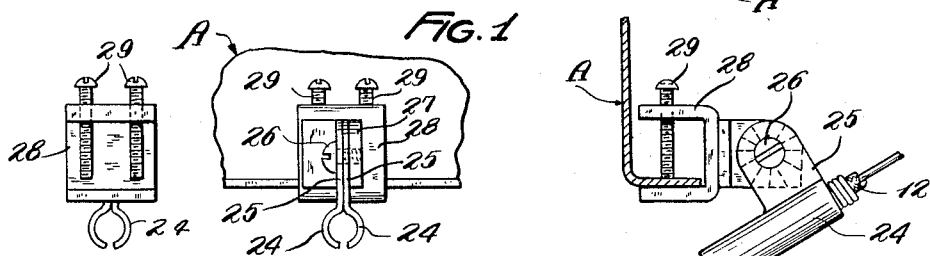
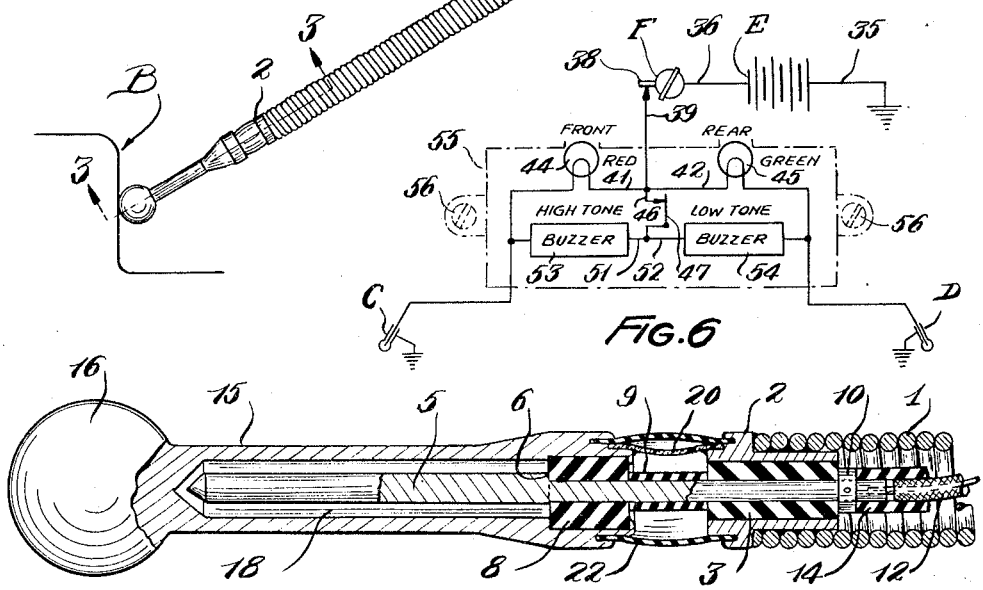
INVENTOR.
CHESTER TYSKA
BY Brennan B. West
ATTORNEY

United States Patent Office 2,786,910
Patented Mar. 26, 1957

2,786,910

ELECTRICAL CURB PARKING SIGNAL FOR AUTOMOBILES

Chester Tyska, Cleveland, Ohio

Application July 14, 1954, Serial No. 443,345

4 Claims. (Cl. 200—61.44)

This invention relates to that class of devices used on automotive vehicles for indicating to the driver, while maneuvering his vehicle in the act of parking alongside a curb or other object, the proximity of the vehicle to such curb or object.

The obvious purpose of the device is to prevent the marring or scuffing of tires, and the scraping or denting of fenders. The device preferably includes two so-called feelers that are attached, respectively, to the front fender and to the rear fender of the vehicle on the curb side thereof, and project outwardly and downwardly therefrom.

Each feeler incorporates a circuit closer that is rendered effective to close a circuit when the outer end of the feeler engages an obstruction, such as a curb. A complete installation may include two feelers, two signal lights respectively associated therewith, an audible signal, which may consist of a buzzer—desirably with a switch for cutting the same in and out at will—together with a source of current, such as the battery of the vehicle, a main switch, preferably one operated by the ignition lock, and a branched electric circuit including the circuit closers of the two feelers and the remainder of the foregoing electrical means.

One object of my invention is to provide a feeler in the form of a normally straight, relatively stiff elongate and slender structure that is flexible and resilient, and is adapted for connection adjacent its inner end to a fender or other part of a vehicle, and that incorporates at its outer end a circuit closer that is very sensitive in its response to contact with a curb or other obstruction for closing a circuit, but will not function to this end when the feeler is flexed or deflected due to jarring or vibration of the vehicle or to wind resistance when the vehicle is traveling at high speed.

Another object is to provide a feeler of the character above described that is substantial and durable and that is capable of withstanding extreme deflection or deformation without injury and which, upon being released from the forces and influences responsible for its deflection or deformation, will immediately resume normal straight condition.

Another object of the invention is to incorporate in the feeler efficient and dependable mounting means by which the feeler may readily be secured to a part of the vehicle, such as a fender, without requiring the part or fender to be punched or drilled, and which includes adjustments by which the angular relation of the feeler to the part of the vehicle whereon it is mounted may be varied, and the extent to which the feeler projects beyond the side of the vehicle may be changed according to the requirement of a particular installation.

The objects and advantages above set forth, with others that will appear as this description proceeds, are attained in the embodiment of the invention illustrated in the accompanying drawing wherein like reference characters designate like parts throughout the several views.

In the drawing,

Fig. 1 is a fragmentary plan view of an automotive vehicle showing it alongside a curb and equipped with the invention including the two feelers that are illustrated as engaging the curb;

Fig. 2 is an elevational view of a feeler, showing it attached to a part of a vehicle and in contact with a curb;

Fig. 3 is an enlarged longitudinal section through the outer end of the feeler, showing the circuit closer in detail;

Figs. 4 and 5 are elevational views of the means for attaching the feeler to a part of the vehicle, and Fig. 6 is a diagram of the circuits of the invention.

In Figs. 1 and 2, the automotive vehicle is designated, generally, by the reference letter A, while B denotes the curb. In the former view, as well as in Fig. 6, the feelers that are carried by the front and rear parts or fenders of the vehicle are designated, respectively, by the letters C and D. The feelers are identical, wherefore a description of one will suffice for both.

A feeler is shown in detail in Figs. 2 and 3. It includes an elongate helical spring 1 of relatively stiff, highly resilient and electrical conductive material, such as a suitable grade of steel. The spring is closely wound with its convolutions normally touching one another, and within the outer end of the spring is secured a tubular fitting 2. Tightly embraced by the tubular fitting is a bushing 3 of rubber, fiber or other insulating material, and extending through the bore of the bushing and beyond the inner end thereof is a part of a rod 5 of electrical conductive metal. The inner end portion of the rod is reduced in diameter, and engaged outwardly against a shoulder 6 between the parts of the rod of different diameters is a sleeve 8 of relatively soft resilient rubber or the like. This sleeve is in outwardly spaced relation to the bushing 3 and is separated therefrom by a tubular spacer 9 of insulating material that is mounted on the reduced portion of the rod. A collar 10 is secured to the rod inwardly of the bushing 3 and holds the rod against outward displacement, and suitably attached, in a manner to insure an efficient electrical connection, to the end of the rod beyond the collar 10 is the bare end of an insulated electrical conductor 12. A thimble 14 of rubber or the like encloses and protects the connection between the conductor and the rod.

15 is a striker that is shown as terminating at its outer end in a ball 16 for contact with a curb or other obstruction. The striker is elongate and has an axial recess 18 that opens through its inner end where the striker is counterbored to receive the beforementioned sleeve 8. To secure the striker against outward displacement its inner end is peened over the corresponding end of said sleeve. The striker is characterized by electrical conductivity and may consist of an integral steel member; and the resilient sleeve 8 is stiff enough to normally hold the striker in spaced, concentric relation to the outer end portion of the rod 5. The extreme outer end of the rod is shown as convexed or, more accurately, as conical, while the opposed end wall of the recess 18, which is in close proximity thereto, has a contour complementary to that of said end. Accordingly, when the striker engages an obstruction and is slightly deflected by reason thereof, said end wall will contact the adjacent end of the rod.

A flexible electrical conductor 20 has its opposite ends soldered or otherwise secured to the striker 15 and fitting 2. Enclosing the conductor 20, as well as the entire space between the striker and fitting, is a sheath 22 of rubber or other suitable flexible material, thereby to protect the electrical connection between the striker and fitting and prevent foreign matter, such as snow or ice, from accumulating within said space and interfering with the action of the striker. The ends of the sheath are shown as contained within circumferential grooves of the striker and fitting.

The spring 1 is held by a split sleeve made up of opposed semi-cylindrical parts 24 that are provided with apertured lugs 25. A screw 26 is projected through the apertures of the two lugs and is threaded into an ear 27 that extends inwardly from a clamp 28 that is fastened, by means of screws 29, to the flange of a fender or other part of the vehicle A. By the means thus described, the feeler may be attached to a part of the vehicle without especially preparing said part for such attachment; and the angular relation of the feeler to the vehicle may be changed by loosening the screw 26, swinging the spring to the desired position, and then tightening the screw; and while the screw is loose, the spring 1 may be adjusted lengthwise through the split sleeve constituted of the parts 24, said parts gripping the spring and holding it in place when the screw is subsequently tightened.

In the diagram of Fig. 6 is shown a branched electric circuit that includes, with the circuit closers of the feelers, visual and audible electric signals for indicating contact of either or both feelers with a curb or other object. E designates the battery of the vehicle, and F the ignition lock. One side of the battery is grounded through a conductor 35, and a conductor 36 leads from the other side of the battery to the ignition lock. A switch 38 is operatively associated with the ignition lock and is closed when the lock is operated to close the ignition circuit. Current is carried from the switch 38 through a conductor 39 to two branch circuits represented, respectively, by conductors 41 and 42. These circuits include signal lights 44 and 45, respectively, and the first mentioned branch circuit continues on through the circuit closer of the feeler C to the ground, while the second mentioned branch circuit leads through the circuit closer of the feeler D to the ground. A conductor 46, including a manual switch 47, leads from the conductor 39 to branch circuits 51 and 52 that are parallel to the portions of the former branch circuits involving the signal lights 44 and 45, and said branch circuits 51 and 52 include audible electric signals, desirably consisting of buzzers, designated, respectively, 53 and 54. Each of the buzzers desirably differs from the other in tone.

These electric signals and the switch 47 are incorporated in a compact unit 55 indicated in broken lines, which is adapted to be secured, as by screws 56, to a part of the vehicle in convenient sight and in hearing range of the driver.

As long as the ignition lock F is in position to maintain the switch 38 closed, which is the position it occupies when the ignition circuit is energized, current will be available to the branched signal circuit, and upon engagement of either feeler with a curb or other obstruction, the branches of the circuit controlled by the circuit closer of said feeler will be supplied with current to cause the corresponding signal light to glow, and the buzzer to sound. When desired, the buzzers may be cut out by opening the switch 47. Obviously, when both feelers are in contact with a curb or other object, all signals will be caused to function, unless the buzzers are cut out in the manner above described.

It is apparent from the construction of the feelers, that the springs 1 may be flexed by vibration, jarring, or wind resistance to a very considerable extent without causing the circuit closers to operate; and that said springs may be deflected and distorted to extreme degrees by engagement with obstructions without being permanently deformed or their ability to resume normal straight condition impaired.

Having thus described my invention, what I claim is:

1. A device of the class described comprising an elongate relatively stiff helical spring of electrical conductive material, a tubular fitting of conductive metal secured in the outer end of said spring, a bushing of relatively hard insulating material occupying said fitting, said bushing having a bore the axis of which is substantially coincident with that of the spring, a rod of electrical conductive metal having its inner end secured within the bore of the bushing and exposed at the inner end thereof, a sleeve of resilient insulating material on the rod outwardly of said bushing, a rigid elongate striker characterized by electrical conductivity having a relatively deep axial recess that opens through the inner end of the striker and into which the rod extends, the striker being engaged at its inner end over the aforesaid sleeve so as to be supported thereby normally out of contact with said rod, a flexible electrical connection between the inner end of the striker and said fitting, a protective sheath of flexible insulating material enclosing said connection and attached at its opposite ends to the striker and fitting, respectively, an insulated electrical conductor extending lengthwise through the spring and having its outer end connected to the inner end of the rod, and means for attaching the spring adjacent its inner end to a part of an automotive vehicle to which the spring is grounded through the medium of said means.

2. A device of the class described comprising the combination and arrangement of parts defined by claim 1, and wherein the outer end of said rod is convexed and the opposed end of the said recess is concaved and are normally in closely spaced relation to each other.

3. A device of the class described comprising an elongate relatively stiff helical spring of electrical conductive material, a tubular fitting of conductive metal secured in the outer end of said spring, a bushing of relatively hard insulating material occupying said fitting, said bushing having a bore the axis of which is substantially coincident with that of the spring, a rod of electrical conductive metal having its inner end portion reduced in diameter and tightly fitted within the bore of the bushing and exposed at the inner end thereof, the rod having a shoulder defining the outer end of its reduced portion, a sleeve of resilient insulating material on the reduced portion of the rod in outwardly spaced relation to said bushing and engaged with said shoulder, a tubular spacer on the rod between said sleeve and bushing, a rigid elongate striker of electrical conductive material having a relatively deep axial recess that opens through the inner end of the striker and is of a diameter somewhat larger than that of the rod, the striker being counterbored for engagement over the aforesaid sleeve and formed at its inner end to overhang the adjacent end of the sleeve, the striker terminating at its outer end in a knob for engagement with an obstruction, a flexible electrical connection between the inner end of the striker and said fitting, a protective sheath of flexible insulating material enclosing said connection and attached at its opposite ends to the striker and spring, respectively, the aforesaid sleeve serving to normally maintain the striker out of engagement with the rod, the end of the rod being convexed and the opposed wall of the recess concaved and normally in closely spaced relation to each other, an insulated electrical conductor extending lengthwise through the spring and having its outer end connected to the inner end of the rod, and means for attaching the spring adjacent its inner end to a part of an automotive vehicle to which the spring is grounded through the medium of said means.

4. A device of the class described comprising an elongate relatively stiff helical spring of electrical conductive material, a tubular fitting of conductive metal secured in the outer end of said spring, a bushing of relatively hard insulating material occupying said fitting, said bushing having a bore the axis of which is substantially coincident with that of the spring, a rod of electrical conductive metal having its inner end secured within the bore of the bushing and exposed at the inner end thereof, a sleeve of resilient insulating material on the rod outwardly of said bushing, a rigid elongate striker characterized by electrical conductivity having a relatively deep axial recess that opens through the inner end of the striker and into which the rod extends, the striker being engaged at its inner end over the aforesaid sleeve so as to be sustained thereby normally out of contact with said rod, an electrical connection between the inner end of the striker and said fitting that yields to relative movement between the striker and said fitting, an insulated electrical conductor extending lengthwise through the spring and having its outer end connected to the inner end of the rod, and means for attaching the spring adjacent its inner end to a part of an automotive vehicle to which the spring is grounded through the medium of said means.

References Cited in the file of this patent

UNITED STATES PATENTS

| | | |
|---|---|---|
| 1,638,983 | Crone | Aug. 16, 1927 |
| 1,883,040 | Solve | Oct. 18, 1932 |
| 2,144,286 | Dawson | Jan. 17, 1939 |
| 2,208,697 | Kermodle et al. | July 23, 1940 |
| 2,482,630 | Mastromarino | Sept. 20, 1949 |
| 2,508,149 | Eliassen | May 16, 1950 |

FOREIGN PATENTS

| | | |
|---|---|---|
| 572,270 | Great Britain | Oct. 1, 1944 |